United States Patent
Panda et al.

(10) Patent No.: US 12,549,961 B2
(45) Date of Patent: Feb. 10, 2026

(54) METHOD AND SYSTEM FOR DEPLOYMENT AND SYNCHRONIZATION OF FLYING-BASE-STATIONS FOR ESTABLISHING COMMUNICATION NETWORK OVER A DESIRED REGION

(71) Applicant: THE INDIAN INSTITUTE OF TECHNOLOGY KHARAGPUR, West Bengal (IN)

(72) Inventors: Kirtan Gopal Panda, West Bengal (IN); Amulya Wilson, West Bengal (IN); Debarati Sen, West Bengal (IN)

(*) Notice: Subject to any disclaimer, the term of this patent is extended or adjusted under 35 U.S.C. 154(b) by 324 days.

(21) Appl. No.: 18/152,514

(22) Filed: Jan. 10, 2023

(65) Prior Publication Data

US 2023/0422048 A1    Dec. 28, 2023

(30) Foreign Application Priority Data

Jun. 28, 2022    (IN) .............................. 202231037130

(51) Int. Cl.
*H04W 16/18*    (2009.01)
*B64C 39/02*    (2023.01)
(Continued)

(52) U.S. Cl.
CPC .......... *H04W 16/18* (2013.01); *B64C 39/024* (2013.01); *B64U 20/80* (2023.01); *G08G 5/26* (2025.01); *G08G 5/80* (2025.01); *H04B 7/18504* (2013.01); *B64U 2101/20* (2023.01); *B64U 2201/00* (2023.01); *H04W 84/005* (2013.01)

(58) Field of Classification Search
None
See application file for complete search history.

(56) References Cited

U.S. PATENT DOCUMENTS

2018/0199210 A1* 7/2018 Zerick .................. H04W 24/04
2019/0044608 A1* 2/2019 Sundaresan ........... H04W 92/02
(Continued)

FOREIGN PATENT DOCUMENTS

| CN | 108260034 B | * | 11/2020 | ......... H04Q 11/0062 |
| CN | 111988762 A | * | 11/2020 | ........... H04B 17/382 |
| EP | 1552321 B1 | * | 7/2009 | ........... G01S 5/0263 |

OTHER PUBLICATIONS

Translation of CN108260034B (Year: 2020).*
Translation of CN-111988762-A (Year: 2020).*

*Primary Examiner* — Jonathan M Dager
*Assistant Examiner* — Charles Pall
(74) *Attorney, Agent, or Firm* — MASUVALLEY & PARTNERS; Peter Martinez

(57) ABSTRACT

Unmanned aerial vehicle (UAV) mount with a base station, also known as Flying Base Station (FBS) has garnered considerable attention for 5G and beyond communication. This invention provides a method and system for deploying a swarm of FBSs over a geographical region autonomously. The proposed 3-D deployment technique exhibit how to place a minimum number of FBSs energy efficiently over a region to offer guaranteed QoS without inter-UAV interference and UAV capacity limit violations. A Master-Slave coordination technique is revealed to maintain inter-FBS synchronization to avoid collisions during the transition. The technique for selecting intermediate hop coordinates is proclaimed under path planning.

14 Claims, 6 Drawing Sheets

Figure 1:
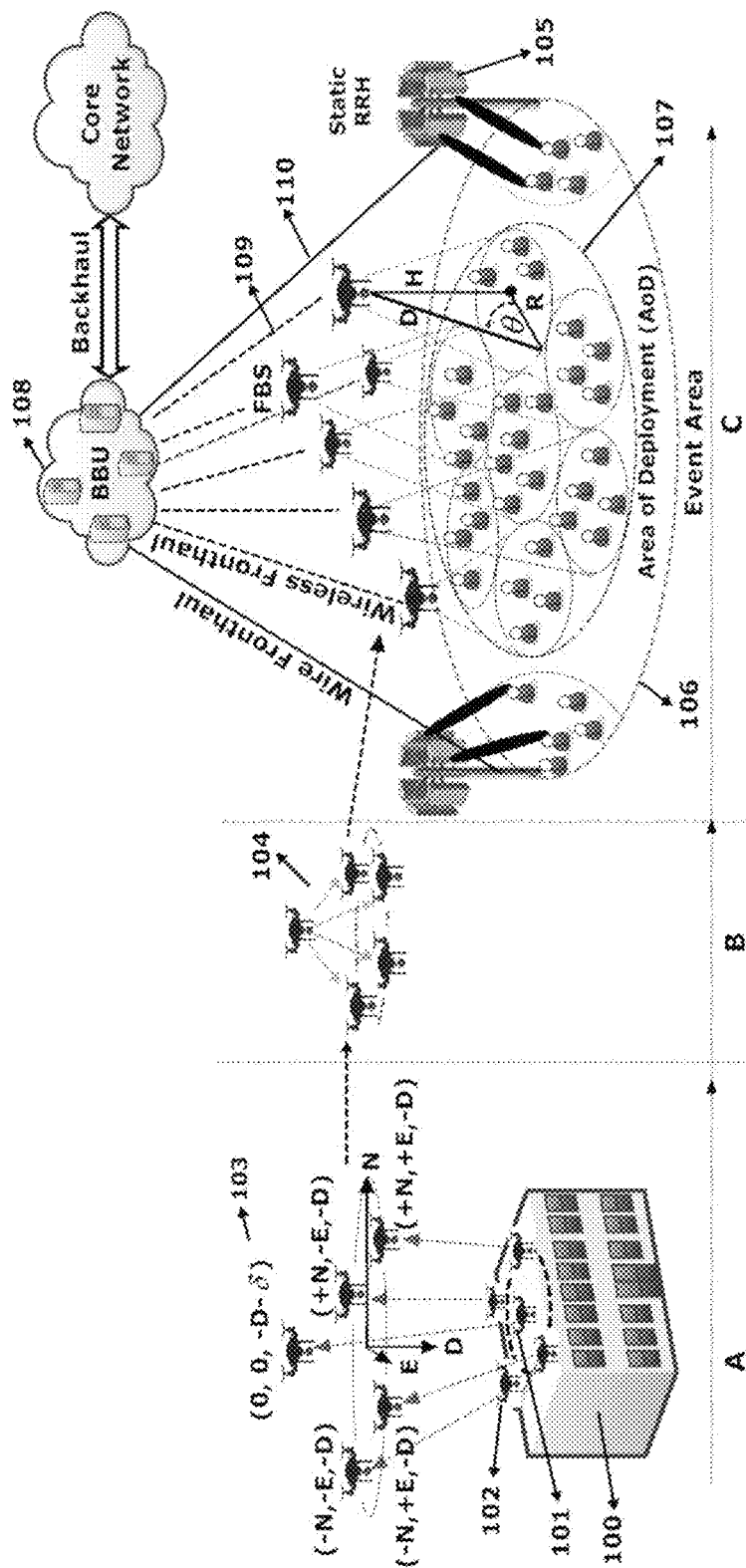

(51) Int. Cl.
*B64U 20/80* (2023.01)
*B64U 101/20* (2023.01)
*G08G 5/26* (2025.01)
*G08G 5/80* (2025.01)
*H04B 7/185* (2006.01)
*H04W 84/00* (2009.01)

(56) References Cited

U.S. PATENT DOCUMENTS

| | | | |
|---|---|---|---|
| 2019/0049549 A1* | 2/2019 | Tang | G05D 1/0246 |
| 2019/0241082 A1* | 8/2019 | Obaidi | H04W 24/02 |
| 2020/0007384 A1* | 1/2020 | Mueck | H04W 4/00 |
| 2020/0205062 A1* | 6/2020 | Azizi | H04W 36/0009 |
| 2021/0327289 A1* | 10/2021 | Kim | G08G 5/56 |
| 2023/0262548 A1* | 8/2023 | Nishikawa | H04W 24/02 370/331 |

* cited by examiner

METHOD AND SYSTEM FOR DEPLOYMENT AND SYNCHRONIZATION OF FLYING-BASE-STATIONS FOR ESTABLISHING COMMUNICATION NETWORK OVER A DESIRED REGION

CROSS-REFERENCE TO RELATED APPLICATION

This application claims priority to Indian Patent Application No. 202231037130 filed on Jun. 28, 2022, which is hereby incorporated herein by reference in its entirety.

FIELD OF THE INVENTION

The present invention relates to a deployment of Unmanned Aerial Vehicle (UAV) based Flying Base Station (FBS) assisted communication network. More specifically, the present invention is directed to provide a system and method for energy-efficient three-dimensional (3-D) deployment of UAV based FBS for offering a FBS assisted communication network over a desired region that offers guaranteed Quality of Service (QoS) with no inter-FBS interference and no FBS capacity limit violation, which are essential for real-time placement of FBSs. The deployed region can be an accessible or hostile region, which demands an autonomous flying of FBS fleet. The invention addresses a Master-Slave coordination technique to maintain inter-FBS synchronization and avoid collisions during the transition. The technique for selecting intermediate hop coordinates is proclaimed under path planning. This invention has extensive commercial value in 5G and beyond networks, disaster management sector, defense sector, tourism sector, IoT and autonomous vehicle industry.

BACKGROUND OF THE INVENTION

Unmanned aerial vehicle (UAV) enabled mobile access network has garnered considerable attention for 5G and beyond communication due to its quick and cost-effective deployment. During large social events like fests, public rallies and Olympics, people gather in one place for a short duration of time. In this overloading scenario, maintaining QoS by deploying additional static base stations is not reasonable in terms of economic and deployment time aspects. UAV mount with a base station, also known as Flying Base Station (FBS), seems to be a promising solution for the overcrowded situation. Similarly, providing an emergency communication service following a disaster using FBSs may be propitious in terms of network restoration time and physical effort. Under exclusive military zones like border areas, FBS-assisted networks can provide instant secure service to expedite search and rescue operations. To provide on-demand network service over a hilly region, an FBS-assisted network may be a smart choice.

Despite such promising opportunities, UAV based network brings several technical challenges and efficient 3-D placement is one of them. Placing a swarm of UAV based FBSs over a desired region needs proper planning to offer a certain QoS as it is essential from both users' and network operators' perspectives while nullifying the inter-FBS interference to prevent throughput degradation, maintaining the FBS's users handling capacity limit and maximizing the flight time of the battery-operated FBS network. While looking towards the network operator's perspective, the minimum number of FBSs with maximum revenue by acquiring the maximum number of user's equipments (UEs) is also desired. The preferred location for FBS deployment will be far away from the telecom operator's office. Thus, proper path planning, including synchronization among FBSs, is essential for the FBS swarm movement autonomously from the source to the destination to avoid any collision.

Also, for FBSs deployment, defining the actual Area of Deployment (AoD) is necessary. According to AoD, the number of required FBSs will decide. For any deployment planning, apart from flight time maximization, interference cancellation, and guaranteed QoS, another essential goal is to find the minimum FBSs to cover the desired region.

It is thus there has been a need for developing an advancement in the deployment of the UAV based FBSs over a targeted geographical region autonomously including placing a minimum number of FBSs energy efficiently over a geographical region to offer a guaranteed QoS without inter-UAV interference and UAV capacity limit violations.

OBJECT OF THE INVENTION

It is thus the basic object of the present invention is to develop a method and system for deploying a swarm of UAV based FBSs over a targeted geographical region autonomously selectively involving a minimum number of UAV based FBSs and placing such UAV based FBSs over said geographical region to offer an energy efficient guaranteed QoS communication service for users in said targeted geographical region.

Another object of the present invention is to develop a method and system for deploying a swarm of UAV based FBSs over a targeted geographical region autonomously selectively involving a minimum number of UAV based FBSs and placing such UAV based FBSs over said geographical region to offer an energy efficient guaranteed QoS communication service for users in said targeted geographical region without inter-UAV interference and UAV capacity limit violations.

Another object of the present invention is to develop a method and system for deploying a swarm of UAV based FBSs over a targeted geographical region autonomously for providing communication service to the users in said targeted geographical region including implementing Master-Slave coordination technique among the UAV while deploying the UAV based FBSs to maintain inter-FBS synchronization to avoid collisions of the UAVs during the transition from source to destination.

Yet another object of the present invention is to develop a method and system for deploying a swarm of UAV based FBSs over a targeted geographical region autonomously for providing communication service to the users in said targeted geographical region including a horizontal placement followed by a vertical placement method.

A still further object of the present invention is to develop a method and system for deploying a swarm of UAV based FBSs over a targeted geographical region autonomously for providing communication service to the users in said targeted geographical region including selecting intermediate hop coordinates for the UAV motion under path planning.

SUMMARY OF THE INVENTION

Thus, according to the basic aspect of the present invention there is provided a system for providing communication network coverage to a target geographical region comprising a fleet of unmanned aerial vehicle-based communication service providing Flying Base Stations (FBSs) including a master FBS as point of contact;

a control server including input unit for receiving un-served users' locations in the target geographical region and processing unit for defining an area of deployment (AoD) of the FBSs to cover all the un-served users' location, said control server is connected to said master FBS to feed all the un-served users' locations to the master FBS;

said master FBS includes computing unit for executing steps to compute minimum required FBSs form said fleet and 3-D positions thereof on the AoD for said communication network coverage;

said master FBS includes operative commutation unit for connection with the FBSs in the fleet under master-slave architecture and share respective 3-D AoD locations of the slave FBSs in the fleet including activating each of the selected slave FBSs to establish a wireless communication link with a base band unit (BBU);

said master FBS moves to destination location at center of the AoD determining intermediate hop coordinates (waypoints) between its initial position and destination location, whereby said master FBS is further configured to activate the selected slave FBSs on establishment of the wireless communication link between themselves for transition to the respective 3-D AoD locations following North-East-Down (NED) coordinates shared by the master FBS, whereby the selected FBSs on reaching to the respective 3-D AoD locations starts hovering at their respective 3-D positions on the AoD and provide required communication services to user's equipment in said AoD.

In the present system, each of the FBSs includes
flight controller module for auto collision avoidance and tracking of the FBS movement with inbuilt sensors such as a gyroscope, compass and accelerometer;
Global Positioning System (GPS) sensor integrated with the flight controller to find location of the FBS.

The said sensors are used for estimating object's distance from the FBS and sending to auto collision avoidance unit of the flight controller for necessary action including sending command to speed control unit to either increase or decrease speed of the FBS and position control unit to change the FBS position to avoid any collision.

In the present system, the master server computing unit computes horizontal position (longitude X, latitude Y), vertical position (altitude H) for each of the slave FBSs.

According to another aspect in the present invention there is provided a method for providing communication network coverage to a target geographical region involving the above system comprising involving the fleet of UAV based FBSs which are under idle phase and located in a launching zone;

defining the AoD by the control server covering all the uncovered users' location by identifying and collecting the locations of unserved users in the geographical region that either fall under a coverage hole between base stations or can't be associated with nearest base stations due to overloading;

feeding all said unserved users' locations to the master FBS for executing steps to find minimum required FBSs and 3-D positions thereof on the AoD for said communication network coverage with no inter-FBS interference and FBS capacity limit violation;

involving the master FBS for selecting required number of the slave FBSs from said fleet based on their Unique Identification Number (UIN) and share their respective 3-D AoD locations;

transition of said master FBS to destination location at center of the AoD determining intermediate hop coordinates (waypoints) between its initial position and the destination location;

activating each of the selected slave FBS to establishes the wireless communication link with the base band unit;

subsequent transition of the selected slave FBSs to their respective 3-D AoD locations following North-East-Down (NED) coordinates shared by the master FBS and on command of the master FBS on establishment of the communication links with the base band unit, wherein swarm of the selected slave FBSs form a hexagonal packing over the AoD and start hovering at their respective 3-D positions and provide the communication services.

In the above method, defining of the AoD includes forming an operating circle region with a minimum radius ($R_{big}$) and center location ($X_{big}$, $Y_{big}$) that can cover all the uncovered users present in the target geographical area.

In the above method, determination of the horizontal position (longitude X, latitude Y) and the vertical position (altitude H) for each of the slave FBSs includes
determining the horizontal positions of the slave FBS that cover maximum number of users equipments (UEs) and simultaneously ensure a certain QoS; and
determining vertical positions of the FBSs by selecting energy-efficient altitude that offers minimum path-loss.

In the above method, determination of the horizontal positions of the slave FBSs including selecting the positions of the FBSs for placement over the AoD under the HCP formation having the master FBS at center location of the AoD and the slave FBSs in lap by lap around the central master FBS comprises feeding the master FBS with slave FBS capacity limit (K), user density ($D_u$), maximum coverage distance ($R_{max}$), AoD center location ($X_{big}$, $Y_{big}$) and its operating circle radius ($R_{big}$);

determining the FBS coverage radius (R) by $$R = \sqrt{\frac{K}{D_u \times \pi}}$$

and total number of the laps (L) required of the AoD using $$L = \left\lceil \frac{R_{big} - R}{2R} \right\rceil,$$

ensuring that the coverage radius (R) satisfying condition $R \leq R_{max}$ for the guaranteed QoS;

deploying initial master FBS at the center location of the AoD circle ($X_{big}$, $Y_{big}$) for acting as reference point for finding other slave FBSs positions;

sequentially placing the slave FBSs in the laps as per determined polar coordinates ($r_{l,m}$, $\theta_{l,m}$) for each slave FBS including filling a particular lap with a certain number of FBSs maintaining condition $N_l = 6l$ where $N_l$ is number of the FBS in $l^{th}$ lap and subsequently increasing lap number for further filling with the slave FBSs, whereby total number of the slave FBSs (S) that fitting inside the AoD circle is $S=3L^2+3L+1$, here, $r_{l,m}$ represents the distance between centers of $m^{th}$ circle located inside the $l^{th}$ lap and the first FBS's center location $(X_{big}, Y_{big})$, $\theta_{l,m}$ indicates angle formed by the center of $m^{th}$ circle in $l^{th}$ lap with the first FBS center location;

transforming the polar coordinates of the FBSs to cartesian coordinates $(x_{l,m}, y_{l,m})$, whereby center locations of all the FBSs are determined by adding their respective cartesian coordinates with the reference coordinate $(X_{big}, Y_{big})$.

In the above method, maximum coverage radius ($R_{max}$) which guarantees a certain QoS is determined by $$L(H, R_{max}) = 20 \log\left(\frac{4\pi f_c}{C}\right) + 20 \log\left(\sqrt{H^2 + R_{max}^2}\right) + \eta_{NLoS} + \frac{\eta_{NLoS} - \eta_{NLoS}}{1 + a\,exp^{-b\left(\left\{\frac{180}{\pi}\tan^{-1}\left(\frac{H}{R_{max}}\right)\right\}-a\right)}}$$

where $f_c$ is the carrier frequency; c is the speed of light; $\eta_{LOS}$ is the average fading loss due to shadowing for a Line of Sight (LoS) communication link;
$\eta_{NLOS}$ is the average fading loss due to shadowing for a Non Line of Sight (NLoS) communication link; a and b are the environmental parameter, which varies in different environments like sub-urban, urban and dense-urban.

In the above method, the FBS user handling capacity limit K is $\lfloor C_{max}/c_u \rfloor$, where $C_{max}$ is maximum supported data rate by the FBS estimated for the FBS's antenna configuration and operating bandwidth and $c_u$ is the data rate promised by FBS to UEs.

In the above method, the FBS polar coordinates $r_{l,m}$ and $\theta_{l,m}$ for first lap is determined by

| $r_{l,m} = 2R$ | $\forall m = 1, 2, \ldots, 6$ |
| --- | --- |
| $\theta_{l,m} = 60 \times (m-1)$ | $\forall m = 1, 2, \ldots, 6$ | whereby for subsequent laps, values of $r_{l,m}$ is obtained for different FBSs with indices (m) inside $l^{th}$ lap by $$r_{l,m} = \begin{cases} 2R \times L & \forall\ m = (1, 1+l, 1+2l, \ldots) \\ \sqrt{3}\,R \times L & \forall\ m = \left(1+\frac{l}{2}, 1+3\frac{l}{2}, \ldots\right) \& l \text{ is even} \\ [\{R(2-l \bmod 2)\}^2 + \{\sqrt{3}\,R \times l\}^2, & \forall \text{ otherwise} \end{cases}$$

and $\theta_{l,m}$ is estimated by $$\theta_{l,m} = \frac{360}{N_l} \times (m-1) \forall\ m = 1, 2, \ldots, N_l$$

In the above method, determining vertical positions of the slave FBSs comprises
finding pathloss as a function of the FBS altitude (H) and its coverage radius (R) as $L(H,R)=P+G-P_n-Y_{th}$ for a given maximum transmittable power (P), directive antenna gain (G) and noise power ($P_n$) to maintain received Signal to Noise Ratio (SNR) of boundary user above a certain threshold value ($Y_{th}$);
finding a stationary point of the slave FBS by increasing values of the slave altitude (H) for the obtained coverage radius (R) from the horizontal placement which corresponds to a minimum average pathloss.

In the above method, transition of the slave FBSs from launching zone to determined 3D location includes path planning and inter-FBS synchronization of the FBSs during transition comprising the steps of
activation of all the selected slave FBSs by the master FBS including resetting the initial reference NED coordinates (0, 0, 0) of the selected slave FBSs;
adding different biases to the initial reference coordinate for maintaining a considerable gap between FBSs to avoid collision during the transition phase and having separation between two consecutive selected slave FBS positions ($L_{SS}$) as $$L_{ss} = \frac{2\pi L_{MS}}{N_s},$$

where $N_S$ is the number of slave FBSs, $L_{MS}$ is the distance between master FBS and slave FBS, which is also the radius of the circle formed by slave FBSs;
transition of the master FBS slightly before a take-off time towards the AoD while the slave FBSs wait until the take-off time as broadcasted by the master FBS, whereby the master FBS also conveys the command to all slave FBSs to configure to GUIDED mode.

In the above method, the master FBS estimates intermediate geodetic hop coordinates according to the hop distance, which is assumed to be twice the FBS separation gap ($L_{SS}$) while flying towards the AoD, and follows the hop coordinates through GPS navigation to reach the target area at an ideal speed;
wherein the master FBS intermittently shares its own NED coordinates as obtained from onboard GPS sensor and sensors of the flight controller with the slave FBSs to guide them to reach AoD, and simultaneously tracks the slaves' movement from their received signal strength indicator;
wherein the slave FBSs on receiving the master FBS NED coordinates fetches its own NED coordinates and computes relative distance $R_N$, $R_E$, $R_D$, which are with respect to the North, East and Down axis and on detecting the relative distance is greater than a predefined threshold distance, the slave FBSs march toward the master FBS to minimize the relative distance, while once the relative distance becomes less than the threshold distance value, the slave FBSs hold its position.

In the above method, magnitude of the velocity component of each slave FBS is directly proportional to the relative distance between present NED location ($N_S$, $E_S$, $D_S$) and its target master FBS's NED location ($N_m$, $E_m$, $D_m$)).

In the above method, the master FBS on finding any slave FBS is missing during transition, broadcasts movement holding command with a time gap to stop all the slave FBSs movement and after that time gap, if the master FBS cannot trace the missing slave FBS, the master FBS march towards the AoD with the remaining slave FBSs, whereby the missing slave FBS after lost communication from the master FBS, change its mode from GUIDED to AUTO mode and move towards the AoD by following its 3-D position shared by the master FBS during the idle phase.

BRIEF DESCRIPTION OF THE ACCOMPANYING DRAWINGS

FIG. 1 System level implementation model for FBS deployment and its different phases of operation.

Figure 2:
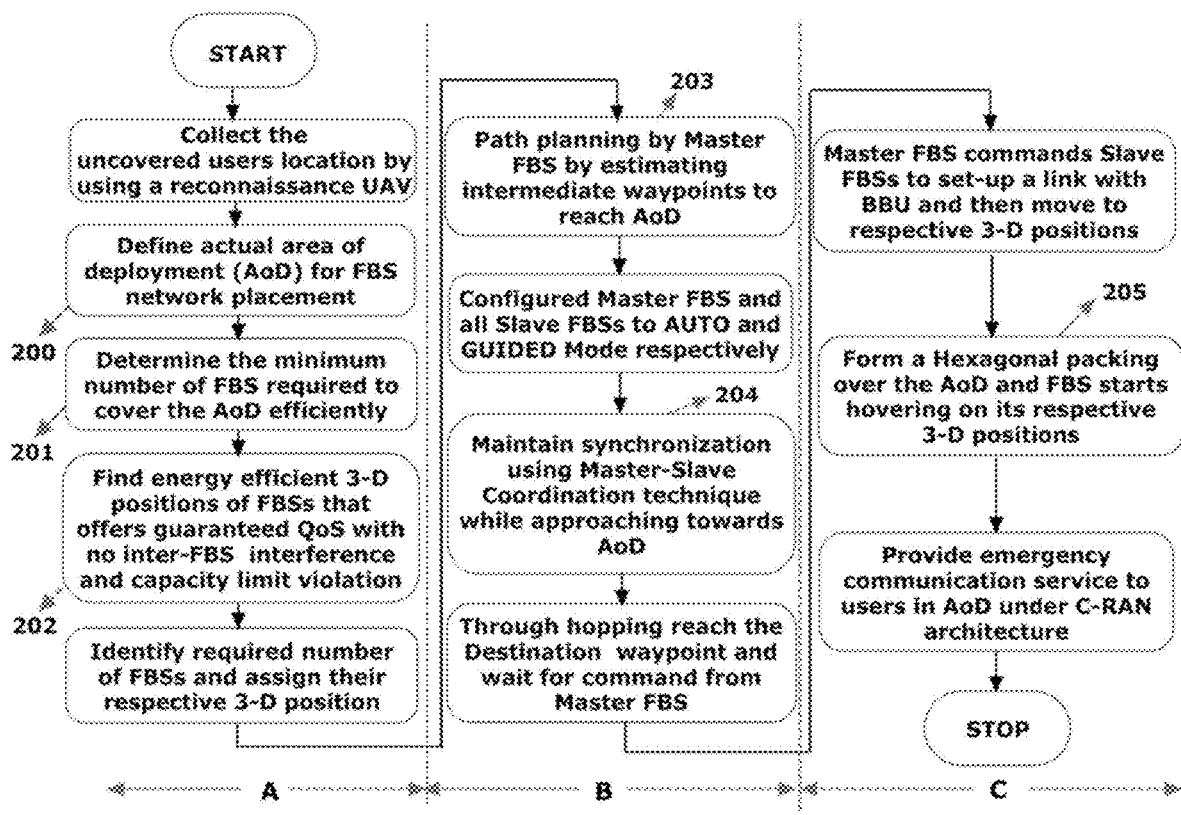

FIG. 2 Steps followed during different phases of operations by the swarm of FBSs.

Figure 3:
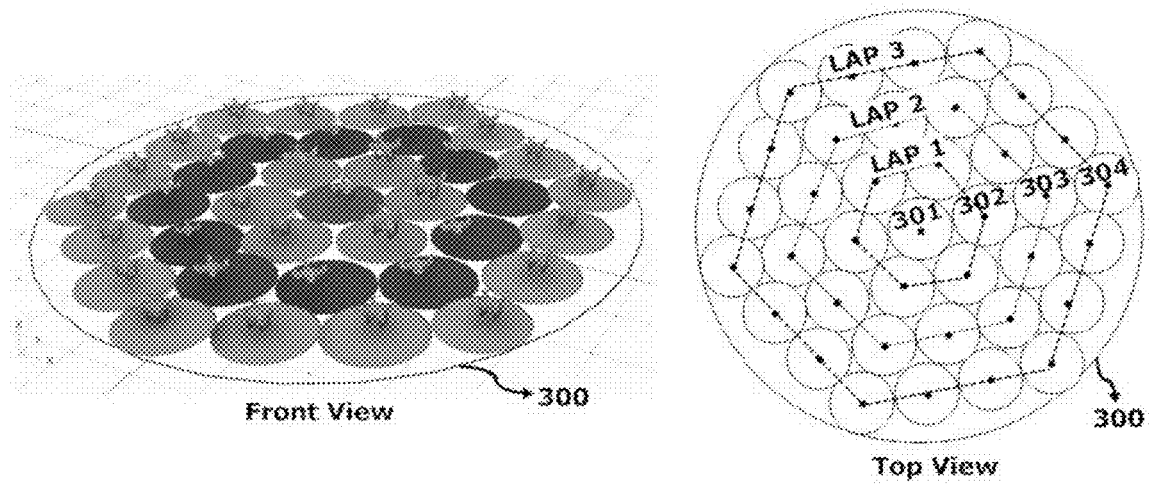

FIG. 3 FBSs deployment using Hexagonal Circle Packing (HCP) method over AoD.

Figure 4:
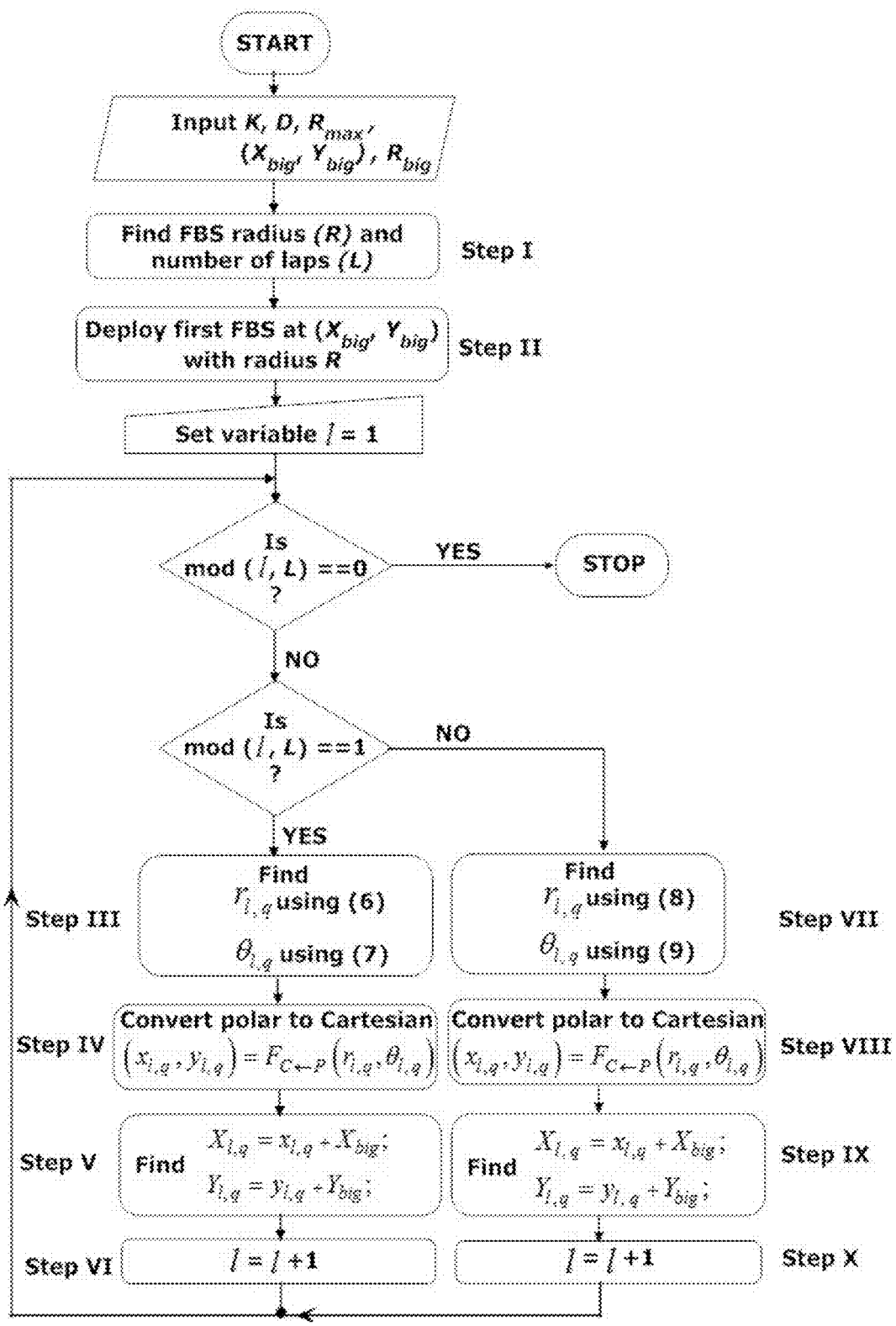

FIG. 4 Steps for horizontal placement of FBSs over AoD under Hexagonal Circle packing technique.

Figure 5:
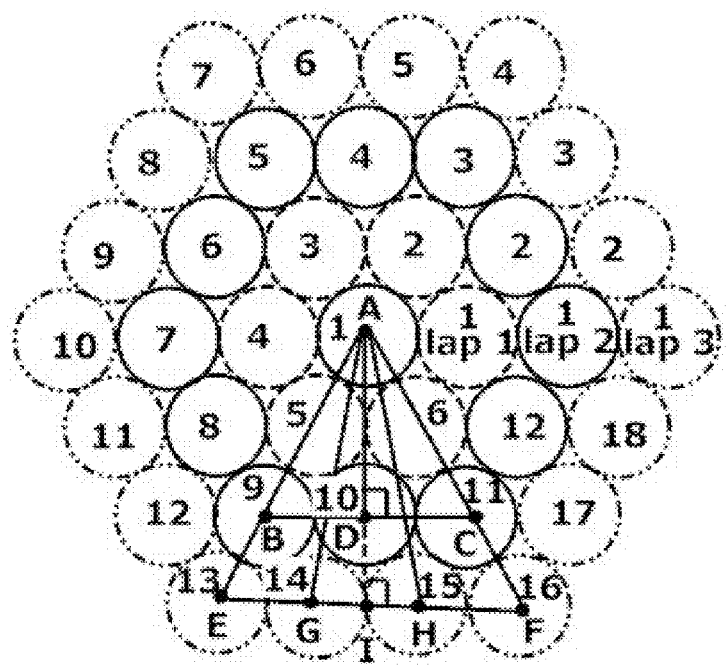

FIG. 5 Top view of FBSs placement under Hexagonal Circle Packing.

Figure 6:
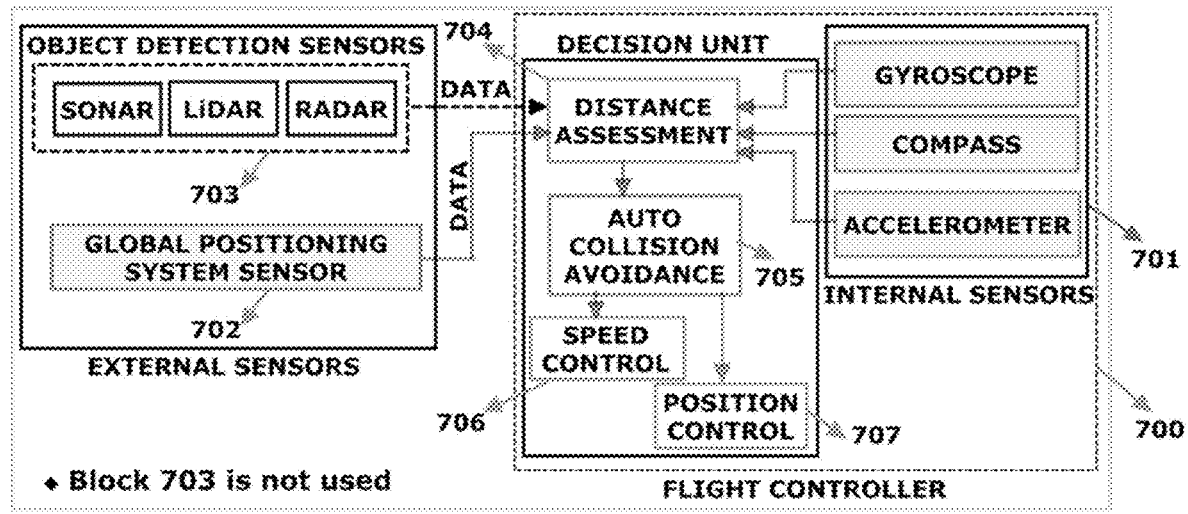

FIG. 6 Modules required for collision avoidance and tracking of FBSs.

Figure 7:
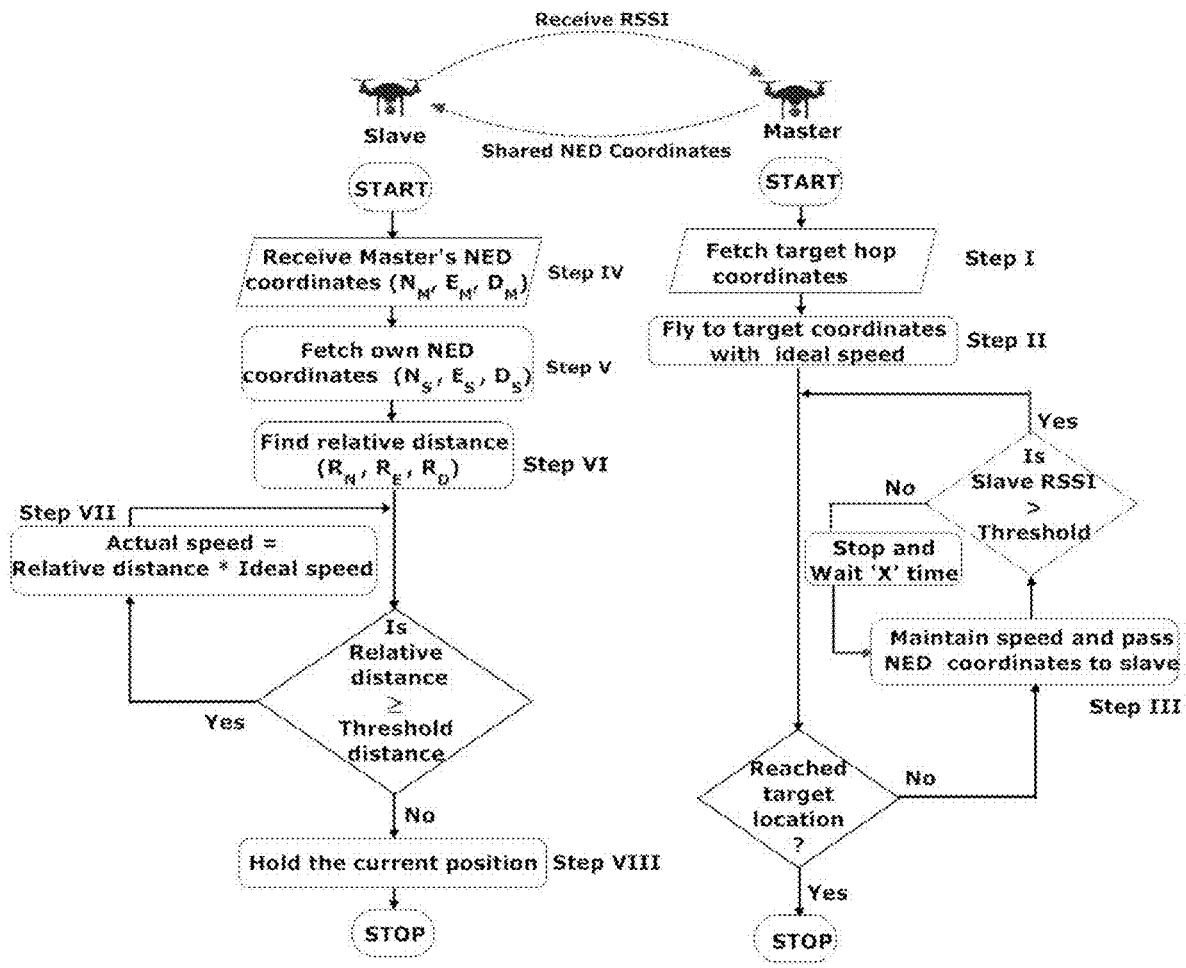

FIG. 7 Master-slave coordination technique followed by FBSs during the transition phase.

Figures 8A, 8B, 8C:
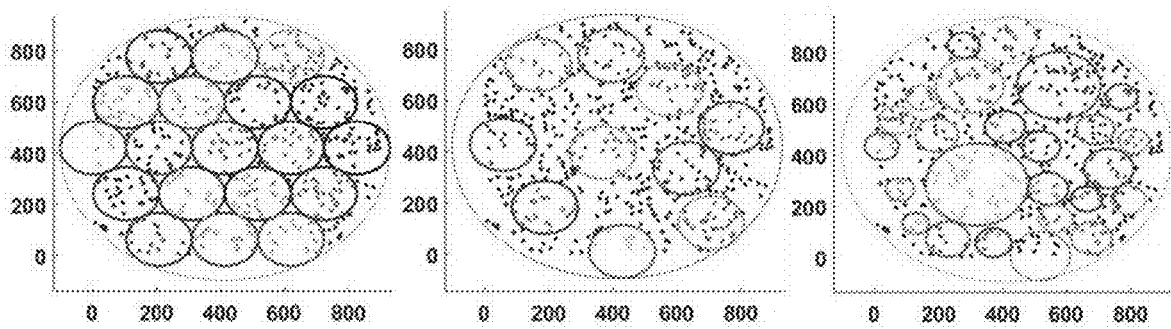

FIGS. 8A to 8C FBS horizontal placement using different deployment techniques. FIG. 8A HCP, FIG. 8B RDFR, FIG. 8C RDVR.

Figure 9:
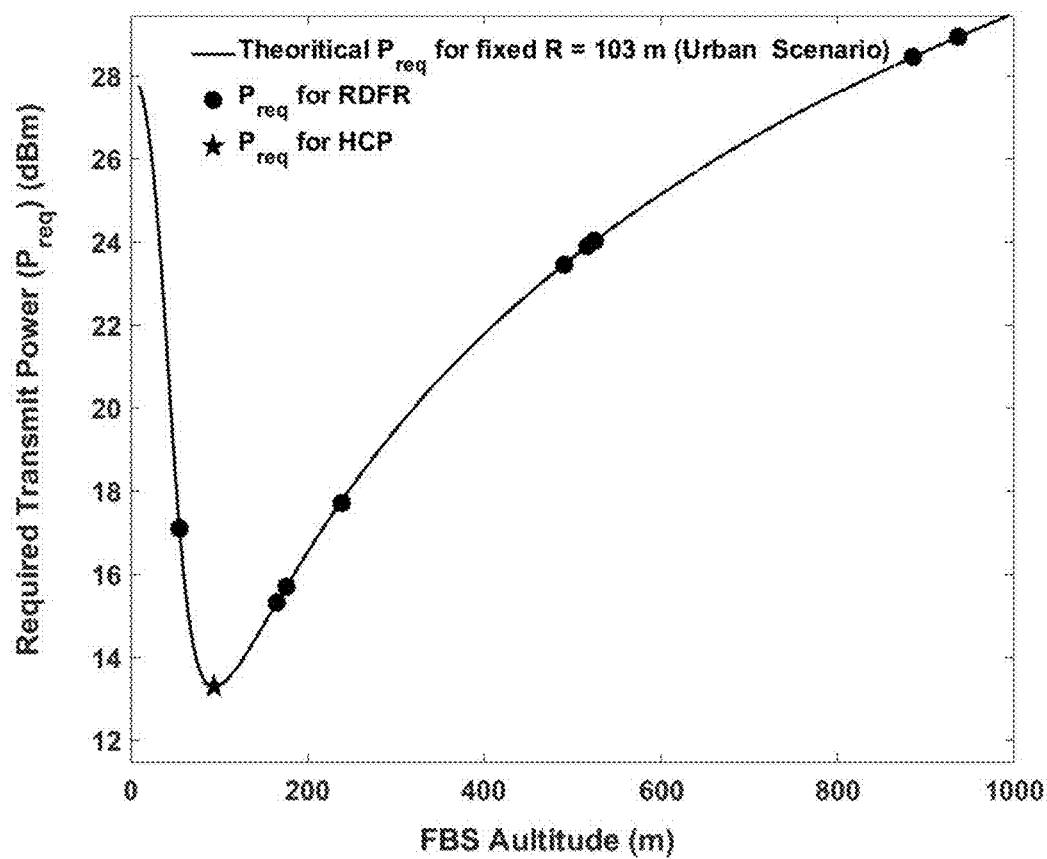

FIG. 9 FBS required transmits power ($P_{req}$) to maintain $Y_{th}$=50 dB for HCP and RDFR deployment.

Figure 10A:
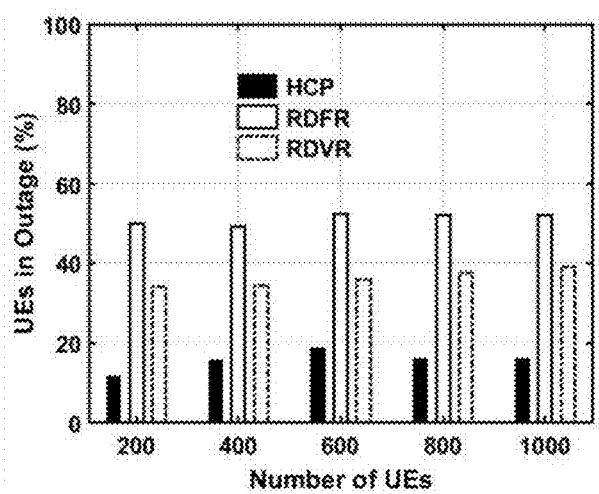
Figure 10B:
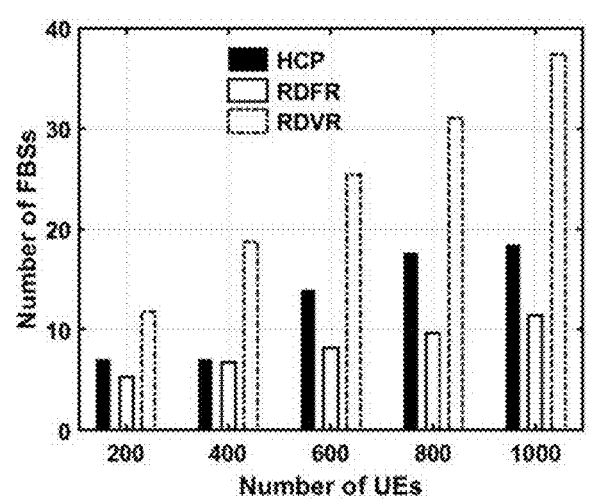

FIGS. 10A and 10B: FBS deployment results for HCP. FIG. 10A UEs in outage, FIG. 10B Number of FBSs

DETAILED DESCRIPTION OF THE INVENTION WITH REFERENCE TO THE ACCOMPANYING DRAWINGS

As stated hereinbefore, the present invention provides a cost-effective and fast method and system for energy-efficient 3-D deployment of FBS assisted network over the desired region that offers guaranteed QoS with no inter-FBS interference and no FBS capacity limit violation, which are essential for real-time placement of FBS. The deployed region can be an accessible or hostile region, which demands an autonomous flying of FBS fleet. Thus, the present invention addresses a Master-Slave coordination technique to maintain inter-FBS synchronization and avoid collisions during the transition. The technique for selecting intermediate hop coordinates is proclaimed under path planning. The details of the present invention is now described as hereunder:

1. 3-D Deployment of Swarm of FBSs Over a Target AoD:

In order to deploy FBSs over the AoD, each FBS has to go through different phases of operation. FIG. 1 depicts the different phases the swarm of FBSs has to go through for the successful deployment over the AoD. The steps followed under each phase are described in FIG. 2. There are mainly three different phases of operation:

A. Idle Phase: Initially, all the FBSs are under the idle phase and assumed to be located either in the launching warehouse or on the helipad of the telecom operator's office (100). At the occurrence of any event like a disaster, social gatherings due to the fest, demand for network coverage extension, and the search operations by the military happen in the event area (106), the FBSs need to take off, fly autonomously to the event area and form a network. For the 3-D placement of FBSs over the event area, it is essential to identify the actual deployment area, i.e., AoD. Based on the size of AoD, the required number of FBSs will determine. The AoD in the event area can be easily defined using the existing literature [Ref: H. Hosseini Nasab, M. Tavana, and M. Yousefi, "A new heuristic algorithm for the planar minimum covering circle problem," Production & Manufacturing Research, vol. 2, no. 1, pp. 142-155, 2014]. Here, a circular region is considered for representing the AoD. It means to define a circle with a minimum radius that should include all the uncovered users present in the event area. The reason for considering a circular AoD is that in real-time, most of the hotspot regions like sports arenas and fest areas are circular in structure. Furthermore, a circular region is usually used to represent the affected zone due to disasters like earthquakes and cyclones. In order to define the AoD, all the uncovered users' location information is required. Thus, the telecom operator should first identify and collect the locations of the unserved users in the event area (106) that either fall under a coverage hole between the existing base stations or can't be associated with the nearest base stations due to overloading.

The collection of uncovered users' location information can be done by releasing a reconnaissance UAV in advance or through the nearby base stations. All the unserved users' locations should feed to a particular FBS, i.e., 101, which acts as the Point of Contact (PoC) for the telecom operator. Only the PoC FBS has an extra computational capacity that is required for executing steps 200, 201 and 202 to define the AoD from the uncovered users' locations using [H. Hosseini Nasab, M. Tavana, and M. Yousefi, "A new heuristic algorithm for the planar minimum covering circle problem," Production & Manufacturing Research, vol. 2, no. 1, pp. 142-155, 2014], find the minimum required FBSs and identify their respective energy-efficient 3-D positions that offer a guaranteed QoS, with no inter-FBS interference and FBS capacity limit violation, respectively. The approaches for steps 201 and 202 to determine the minimum number of FBS and their respective 3-D positions will discuss later in details. Once the number of FBSs and their respective 3-D positions are obtained, the PoC FBS will select the required number of other FBSs by their Unique Identification Number (UIN) and share their respective 3-D locations. After that, the swarm of FBSs needs to take off and fly towards AoD under the transition phase.

B. Transition Phase: During the transition phase, proper path planning with better inter-FBS synchronization is essential. The PoC FBS, alternatively known as Master FBS, determines the intermediate hop coordinates (waypoints) between its initial position and destination location (center of AoD). Before flying towards AoD, the Master FBS will configure itself to autonomous (AUTO) mode as it has to follow the geodetic hop coordinates. All Slave FBSs will configure to GUIDED mode as they need to follow the North-East-Down (NED) coordinates shared by the Master FBS. While flying towards AoD, a Master-Slave coordination technique needs to follow to maintain synchronization among FBSs. Under the Master-Slave coordination (104), to maintain a fixed gap among all FBSs to avoid any collision during the transition phase, some bias will initially add to the reference NED coordinates of all FBSs. Adding bias of (+N, +E, −D) to reference coordinates (0, 0, 0) of 102 FBS means the FBS will first move to +N meters along the North axis, +E meters along the East axis and −D meters along the Down axis and consider it as the reference point. For Master FBS 101, a bias 103 will add only to the Down reference coordinate to keep it at the center with a higher altitude than all slaves. A detailed explanation of step 203 for path planning and step 204 related to inter-FBS synchronization between FBSs will discuss later.

C. Hovering Phase: After reaching the center of AoD, each FBS in fleet 104 first establishes a wireless communication link 109 with the Base Band Unit (BBU) 108 under the hovering phase. The fleet of FBSs works as Remote Radio Heads (RRHs) similar to the existing static RRH 105 and operates under the Cloud Radio Access Network (C-RAN) based architecture. The centralized architecture of C-RAN helps in avoiding the interference between FBS and its nearby existing base station 105 by assigning a different frequency band. Once the communication links are established with BBU 108, the Master FBS will command all Slave FBSs to fly to their respective 3-D position, which is already shared during the idle phase. In a situation like the non-availability of telecom infrastructures (like C-RAN), each FBS works independently as a Micro or Femto flying base station at their respective 3-D positions. The swarm of FBSs will form a hexagonal packing of circles over the AoD. Step 205 about hexagonal circle packing of FBSs is discussed below. The FBSs start hovering at their respective 3-D positions and provide communication services to the ground users.

2. Method of Finding AoD and the Number of FBS with 3-D Positions Under Idle Phase:

The AoD is defined by a big circle with a minimum radius ($R_{big}$) and center location ($X_{big}$, $Y_{big}$) that can cover all uncovered users present in the event area. After defining the AoD using [H. Hosseini Nasab, M. Tavana, and M. Yousefi, "A new heuristic algorithm for the planar minimum covering circle problem," Production & Manufacturing Research, vol. 2, no. 1, pp. 142-155, 2014], the next goal is to deploy FBSs efficiently inside the AoD to improve the network coverage. For the 3-D deployment of an FBS, including the horizontal position (longitude, latitude), the vertical position (altitude) is also essential. Here onwards, the 3-D position (longitude, latitude, altitude) of an FBS is represented by (X, Y, H), respectively. While determining the horizontal positions of FBSs, it is essential to select those positions that guarantee a certain QoS without inter FBS interference and FBS capacity limit violation. Similarly, for finding vertical positions of FBSs, the objective is to select an energy-efficient altitude that offers the minimum pathloss. Here, the 3-D placement strategy bifurcates into horizontal and vertical placement strategies.

A. Horizontal Placement Strategy: A Hexagonal Circle Packing (HCP) method is disclosed here for the horizontal placement of FBSs over the AoD. Under HCP, circles (as FBS has circular coverage) are packed efficiently over the AoD. FIG. 3 depicts the front and top view of FBSs placement under the HCP method. The circular coverage regions formed by each FBS are closely packed inside the AoD 300. The central FBS (Master FBS) 301 is placed at the center location of the AoD 300, whereas other FBSs are placed lap by lap around the central FBS 301. In FIG. 3, there are three laps: Lap1, Lap 2 and Lap 3 around the central FBS 301. As per the FIG. 3, FBS 302 is in Lap 1, FBS 303 is in Lap 2 and FBS 304 is in Lap 3. In each lap, only a fixed number of FBSs can fit. Depending on the size of AoD and the coverage radius of FBS, the number of required laps will be decided. As the size of AoD is already known, the coverage radius of each FBS needs to find out to comment on the number of laps required inside the AoD.

Under HCP, in order to satisfy the QoS requirement, each FBS has to maintain the received Signal to Noise Ratio (SNR) of the boundary user above a certain threshold value ($Y_{th}$). Instead of Signal to Interference and Noise Ratio (SINR), SNR is considered here; as in HCP, each FBS is assumed to be equipped with directive antennas and placed without overlapping of coverage region. For a given FBS maximum transmit power (P), directive antenna gain (G) and noise power ($P_n$), the maximum allowable path loss (L(H,R)) to maintain the SNR threshold ($Y_{th}$) may be determined as follows:

$$L(H,R)=P+G-P_n-Y_{th} \quad (1)$$

The path loss (L(H,R)) is a function of FBS altitude (H) and its coverage radius (R). It is observed for a fixed pathloss, R gives an inverted U-shaped graph with the increasing values of H and there is only one stationary point corresponding to the maximum coverage radius ($R_{max}$) [Hourani, S. Kandeepan, and S. Lardner, "Optimal LAP Altitude for Maximum Coverage", IEEE Wireless Commun. Lett., vol. 3, no. 6, pp. 569-572, 2014]. At the stationary point, the relation between $R_{max}$, H and optimum elevation angle is $$\theta = \tan^{-1}\left(\frac{H}{R_{max}}\right).$$

The optimum elevation angle is defined as the angle formed by the user present at the boundary of the FBS coverage region and its served FBS (refer FIG. 1). The optimum elevation angle ($\theta$) is already defined in [Hourani, S. Kandeepan, and S. Lardner, "Optimal LAP Altitude for Maximum Coverage", IEEE Wireless Commun. Lett., vol. 3, no. 6, pp. 569-572, 2014] for the different environments like sub-urban, urban and dense-urban. So, for the obtained maximum allowable pathloss, the maximum coverage radius ($R_{max}$) that guarantees a certain QoS can be determined by using the following equation:

$$L(H, R_{max}) = 20 \log\left(\frac{4\pi f_c}{C}\right) + \\ 20 \log\left(\sqrt{H^2 + R_{max}^2}\right) + \eta_{NLoS} + \frac{\eta_{NLoS} - \eta_{NLoS}}{1 + a\, exp^{-b\left\{\left\{\frac{180}{\pi}\tan^{-1}\left(\frac{H}{R_{max}}\right)\right\}-a\right\}}} \quad (2)$$

where $f_c$ is the carrier frequency; c is the speed of light; $\eta_{LOS}$ is the average fading loss due to shadowing for a Line of Sight (LoS) communication link; $\eta_{LOS}$ is the average fading loss due to shadowing for a Non Line of Sight (NLoS) communication link; a and b are the environmental parameter [Hourani, S. Kandeepan, and S. Lardner, "Optimal LAP Altitude for Maximum Coverage", IEEE Wireless Commun. Lett., vol. 3, no. 6, pp. 569-572, 2014], which varies in different environments like sub-urban, urban and dense-urban. The $R_{max}$ is the upper bound for any FBS to offer guaranteed QoS. Under HCP, each FBS has the same coverage radius to ensure a low complex deployment technique. However, the coverage radius may change according to different UE density ($D_u$) and FBS capacity limit (K) values. From the number of UEs present inside the AoD, UE density can be evaluated. The FBS user handling capacity limit K is $\lfloor C_{max}/c_u \rfloor$, where $C_{max}$ is the maximum supported data rate by the FBS estimated for the FBS's antenna configuration and operating bandwidth and $c_u$ is the data rate promised by UAV to UEs. After obtaining D and K, the actual coverage radius (R) of the FBS is estimated as:

$$R = \sqrt{\frac{K}{D_u \times \pi}} \quad (3)$$

It is compulsory that the obtained coverage radius (R) must satisfy the condition $R \leq R_{max}$ for the guaranteed QoS. Suppose the condition violates, then R will be $R_{max}$. After obtaining the actual coverage radius of FBS, it is essential to find the number of circular laps required to cover all users inside the AoD. In some cases, it may happen that $R_{big}$ may not be completely divisible by R. To pack FBSs compactly, we need to readjust the $R_{big}$ value. The number of circular laps (L) can be determined by $$L = \left\lceil \frac{R_{big} - R}{2R} \right\rceil \quad (4)$$

In each lap, a certain number of FBSs can only deploy. If we denote the number of FBS in $l^{th}$ lap by $N_l$ then $N_1=6$, $N_2=12$, and $N_3=61$. The total number of FBSs (S) that will fit inside the big circle can be determined by the following equation.

$$S = 3L^2 + 3L + 1 \quad (5)$$

FIG. 4 shows the steps to find the horizontal positions of FBSs under HCP. The list of inputs required to feed the PoC FBS (101) for determining the horizontal positions are the FBS capacity limit (K), user density ($D_u$) and maximum coverage distance ($R_{max}$), AoD center location ($X_{big}$, $Y_{big}$) and its radius ($R_{big}$). The first step (Step I in FIG. 4) is to find the FBS coverage radius (R) using Eq. (3) and the total number of laps (L) required using Eq. (4). The initial FBS with radius R will be deployed at the center location of the big circle, i.e., ($X_{big}$, $Y_{big}$) (Step II in FIG. 4). The first FBS center is now the reference point for finding other FBSs positions. During FBSs deployment inside the laps, it is essential to count the number of laps and stop when all the laps are packed by FBSs. Thus, a variable 'l' is used and initialized to 1. The mod function is used to check the stopping condition.

For placing FBSs inside a lap, at first, the polar coordinates ($r_{l,m}$, $\theta_{l,m}$) of each FBS needs to be found out and then transformed to Cartesian coordinates ($x_{l,m}$, $y_{l,m}$). Here, $r_{l,m}$ represents the distance between the centers of $m^{th}$ circle located inside the $l^{th}$ lap and the first FBS's center location ($X_{big}$, $Y_{big}$). Similarly, $\theta_{l,m}$ indicates the angle formed by the center of $m^{th}$ circle in $l^{th}$ lap with the first FBS center location. To better understand the HCP placement strategy, the top view of the horizontal placement of FBS under HCP is illustrated again in FIG. 5.

There are three laps shown in FIG. 5, where each lap is represented with a different type of line format (first lap→dashed line, second lap→solid line, third lap→dotted line) and each FBS inside the lap is assigned with an index number from 1 to $N_l$. For lap 1, all the FBSs (FBS 1 to FBS 6) have equal distances from the central FBS. Whereas FBS 1 and FBS 2 in lap 2 has different distance from central FBS due to hexagonal packing. A similar case is noticed for lap 3. Therefore, two different equations are presented for lap 1 and other laps to determine $r_{l,m}$. After initializing the variable 'l' to 1 (FIG. 4), it is required to check whether all the laps are filled, followed by distinguishing lap 1 from other laps. Therefore, the mod function is used. For lap 1, the polar coordinates $r_{l,m}$ and $\theta_{l,m}$ can be determined by the following equations (Step III in FIG. 4).

| | | |
|---|---|---|
| $r_{l,m} = 2R$ | $\forall m = 1, 2, \ldots, 6$ | (6) |
| $\theta_{l,m} = 60 \times (m-1)$ | $\forall m = 1, 2, \ldots, 6$ | (7) |

After getting the polar coordinates, to transform these to Cartesian coordinates a function $F_{C \leftarrow P}(r, \theta)$ is used (Step IV in FIG. 4). The center locations of all FBSs present in lap 1 are determined by adding their respective Cartesian coordinates with the reference coordinate ($X_{big}$, $Y_{big}$) (Step V in FIG. 4). Then the variable 'l' is incremented by 1 to consider the next lap (Step VI in FIG. 4). From lap 2 onwards, the values of $r_{l,m}$ will be different for FBSs. The $r_{l,m}$ can be obtained for different FBSs with indices 'm' inside $l^{th}$ lap by the following equation.

$$r_{l,m} = \begin{cases} 2R \times l, & \forall\ m = (1, 1+l, 1+2l, \ldots) \\ \sqrt{3} R \times l, & \forall\ m = \left(1 + \frac{l}{2}, 1 + 3\frac{l}{2}, \ldots\right) \& l \text{ is even} \\ [\{R(2-l \bmod 2)\}^2 + \{\sqrt{3} R \times l\}^2]^{0.5}, & \forall\ \text{otherwise} \end{cases} \quad (8)$$

The derivation of $r_{l,m}$ for different FBSs located in different laps (shown in FIG. 5) is as follows. For lap 2 (l=2), l is even and the indices (m=1, 2, ..., 12) either represented by (1, 1+l, 1+2l, ...) or $$\left(1 + \frac{l}{2}, 1 + 3\frac{l}{2}, 1 + 5\frac{l}{2}, \ldots\right).$$

For indices (1, 3, 5, 7, 9, 11) which represented by (1, 1+l, 1+2l, ...), the $r_{l,m}$ will be simply 2R×l. Whereas for other indices that represented by $$\left(1 + \frac{l}{2}, 1 + 3\frac{l}{2}, 1 + 5\frac{l}{2}, \ldots\right),$$

the $r_{l,m}$ will be the height (AD) of equilateral $\triangle$ ABC of sides 2R×l. So, $r_{l,m}$ will be $\sqrt{3}$R×l. For lap 3 (l=3), l is odd. Thus, $r_{l,m}$ of an FBS can either be 2R×l or $$\sqrt{R^2 + (\sqrt{3} Rl)^2}.$$

For m=(1, 1+l, 1+2l, ...), $r_{l,m}$ will be simply 2R×l. For other indices like 14 and 15 in lap 3, $r_{l,m}$ will be the length of 'AG' and 'AH' of $\triangle$ AIG and $\triangle$ AIH, respectively. As $\triangle$ AIG and $\triangle$ AIH are congruent due to Side Angle Side (SAS) rule, 'AG' and 'AH' are equal. The value of 'AG' will be $$\sqrt{R^2 + (\sqrt{3} Rl)^2}.$$

Similarly, for lap 4 (l=4), $r_{l,m}$ for other indices will be $$\sqrt{(2R)^2 + (\sqrt{3}Rl)^2}.$$

The common expression for other indices of any lap can be formulated as $$\sqrt{(R(2 - l \bmod 2))^2 + (\sqrt{3}Rl)^2}.$$

From the second lap onwards, $r_{l,m}$ for different indices can be determined from Eq. (8) and $\theta_{l,m}$ can be estimated according to Eq. (9) (Step VII in FIG. 4).

$$\theta_{l,m} = \frac{360}{N_l} \times (m-1) \; \forall \, m = 1, 2, \ldots, N_l \tag{9}$$

After getting the polar coordinates, conversion to Cartesian coordinates can be done using the function $F_{C \leftarrow P}(r, \theta)$ (Step VIII in FIG. 4). The center locations of all FBSs are determined by adding their respective Cartesian coordinates with the reference coordinate ($X_{big}$, $Y_{big}$) (Step IX in FIG. 4). Then the variable l is incremented by 1 till all laps get filled by FBSs (Step X in FIG. 4).

B. Vertical Placement Strategy: It is evident from Eq. (2) that the altitude of an FBS can directly affect the pathloss for a fixed coverage radius. From the horizontal placement technique, we will get the coverage radius and the 2-D position of each FBS that offers a guaranteed QoS with no inter-FBS interference and FBS capacity limit violation. For the obtained radius, finding an optimum height that offers the minimum pathloss is the objective of the vertical placement method. The optimization framework for obtaining optimum height is as follows:

$$\underset{H}{\text{Minimize}} \; L(H, R) \tag{10}$$

s.t. $H_{min} \leq H \leq H_{max}$

Here, $H_{min}$ and $H_{max}$ are the search space boundary limits for finding the optimum altitude (H) of the FBS. It is observed from [Hourani, S. Kandeepan, and S. Lardner, "Optimal LAP Altitude for Maximum Coverage", IEEE Wireless Commun. Lett., vol. 3, no. 6, pp. 569-572, 2014] that for a fixed pathloss, the coverage radius gives an inverted U-shaped graph for the increasing values of FBS altitude irrespective of the environment, such as sub-urban, urban and dense urban. It means for the maximum allowable pathloss obtained from Eq. (1), an inverted U-shaped curve will obtain for coverage radius for an increasing value of H. From the inverted U-shaped graph, for the fixed coverage radius of the FBS obtained from horizontal placement, i.e. R, we can find the search space boundary limits $H_{min}$ and $H_{max}$. It is observed from Eq. (2) that for a fixed coverage radius, the average pathloss follows a U-shaped curve for increasing values of FBS altitude irrespective of the environment. Thus, for the obtained coverage radius (R) from the horizontal placement, the average pathloss will be minimum at a certain altitude only. The optimization framework (Eq. (10)) will help to find that optimum altitude. After obtaining the optimum vertical position, the 3-D position of the FBS will be (X, Y, H).

3. Path Planning and Inter-FBS Synchronization of Swarm of FBSs During Transition:

Once the PoC FBS 101 determines the required number of FBSs and their respective 3-D locations, it selects those required number of FBSs according to the UIN and shares their respective 3-D positions. The PoC FBS creates a primary list that stores all the selected UIN. After sharing the 3-D positions, the PoC FBS commands all selected FBSs to reset their initial reference NED coordinates (0, 0, 0) by adding different biases. Under NED coordinate system, when an FBS follows another FBS, it always maintains a distance that exists initially between their reference coordinates. It may happen while FBSs are on the roof of the telecom office; the required separation between FBSs to avoid collision may not be sufficient due to space limitations. Thus, adding bias to the initial reference coordinate helps in maintaining a considerable gap between FBS to avoid collision during the transition phase. The PoC FBS will decide the bias for all other FBSs. We can see from FIG. 1, the PoC FBS 101 (also known as Master) and all other selected FBSs (known as Slaves) form a circular shape (104), where the Master is at the center. The Master will add a bias of (0, 0, −D−δ) to its reference coordinate (0, 0, 0) to change the reference position to a higher height than all Slaves. Depending on the number of Slaves, the separation between two consecutive Slave positions ($L_{SS}$) is decided by:

$$L_{SS} = \frac{2\pi L_{MS}}{N_s} \tag{11}$$

where $N_S$ is the number of Slaves, $L_{MS}$ is the distance between Master and Slave, which is also the radius of the circle formed by Slaves. For a higher value of $N_S$, the radius $L_{MS}$ may increase up to the maximum communication range of an FBS. The Master FBS decides the position of all Slaves on the circle according to Slave's UIN sequence in the primary list. For each Slave, the required bias to change the NED reference coordinate is decided by the Master FBS according to its own reference position (0, 0, −D−δ), Master-Slave distance $L_{MS}$ and the separation gap $L_{SS}$.

After resetting the reference coordinates, all the Slave FBSs will wait until the take-off time, broadcasted by the Master FBS. In addition to the take-off timing, the broadcast frame from Master also conveys the command to all Slave FBSs to configure to the GUIDED mode. The Master FBS will take off slightly before the take-off time of all Slave FBSs. During the transition of the FBS fleet towards the target area (i.e., AoD), it is essential to avoid any inter-FBS collision and track other FBSs.

FIG. 6 illustrates the different modules usually required to avoid inter-FBS collision and track FBSs' movement during the transition. The flight controller module (700) of FBS acts as the brain for auto collision avoidance and tracking of FBS movement. The flight controller module usually has inbuilt sensors (701) such as a gyroscope, compass and accelerometer, which are essential for FBS movement. An external Global Positioning System (GPS) sensor 702 usually integrates with the flight controller to find the location. For identifying nearby FBSs, the object detection sensors (703) such as SOund Navigation And Ranging (SONAR), Light Detection And Ranging (LiDAR) and RAdio Detection And Ranging (RADAR) are usually used. For collision avoidance, the object detection sensors send raw data to distance assessment unit 704. The object's estimated distance will be sent to auto collision avoidance unit 705 for necessary action. Depending on the object distance, 705 will send a command to speed control unit 706 to either increase or decrease the speed of FBS and position control unit 707 to change the position to avoid any collision. However, the use of object detection sensors puts an extra burden on the budget and power consumption of FBS. By keeping it in mind, we try to propose a new collision avoidance method by excluding the use of object detection sensors presented in 703. A Master-Slave synchronization technique is revealed to maintain the synchronization among FBSs by using only the inbuilt sensors 701 and the GPS sensor 702.

FIG. 7 depicts the Master-Slave synchronization technique followed by FBS fleet during the transition phase. In this technique, the Master follows the geodetic coordinates and the Slave FBSs follow NED coordinates shared by the Master. The Master's geodetic coordinates are the intermediate hop coordinates (waypoints) between the source location (GPS location of Master during Idle phase) and destination location (center of AoD). The Master estimates the intermediate geodetic hop coordinates according to the hop distance, which is assumed to be twice the FBS separation gap ($L_{SS}$) (Step I of FIG. 7). While flying towards AoD, both Master and Slaves will maintain an altitude much higher than the ground infrastructures like skyscrapers, monuments and cellular towers. Thus, the intermediate hop coordinates follow a rectilinear path between source and destination.

Master follows the hop coordinates through GPS navigation to reach the target area at an ideal speed (Step II of FIG. 7). In order to guide the Slaves to reach AoD, the Master shares its own NED coordinates with them at regular intervals (Step III of FIG. 7) and simultaneously tracks the Slaves' movement from their Received Signal Strength Indicator (RSSI). The NED coordinates can easily obtain with the help of a GPS sensor and the inbuilt sensors of the flight controller. The handshaking for sharing of NED coordinates from master to slaves and tracking of RSSI of slaves by the master will be done as follows. Master initially broadcast a frame that includes the UIN of all existing Slaves and their respective timing for communication with Master. Immediately following the broadcast, a time gap exists to address any missing UIN in the frame. If any Slave UIN is not present, then that Slave can transmit its UIN to the Master. From the primary list, the Master verifies the received UIN and again broadcasts the new list of UIN with their timing for communication if the UIN was missing earlier. At the mentioned timing, Master communicates with its Slaves one after another, where Master first shares its NED coordinates and receives an acknowledgment from Slave. From the acknowledgment (ACK), the Master can track the RSSI of each Slave and compare it with a threshold RSSI to check whether the Slave is within a threshold distance or out of that. If Slave FBS RSSI is less than the threshold value, then Master FBS waits for Slave FBS for a predefined time of 'X' so that Slave FBS comes within the threshold range.

The Slave first receives the Master NED coordinates (Step IV of FIG. 7), which is with respect to North, East and Down axis. Then the Slave also fetches its own NED coordinates (Step V of FIG. 7) and finds the relative distance $R_N$, $R_E$, $R_D$, which are with respect to the North, East and Down axis (Step VI of FIG. 7). If the relative distance is greater than the pre-defined threshold distance, then the slave will march toward the Master to minimize the relative distance. The magnitude of the velocity component is directly proportional to the relative distance between its present NED location ($N_S$, $E_S$, $D_S$) and its target location (Master's NED location ($N_m$, $E_m$, $D_m$)) (Step VI of FIG. 7). Usually, small errors may exist in sensors' precision while measuring NED coordinates. Therefore, up to a certain threshold value of the relative distance should be accepted instead of zero. Once the relative distance becomes less than the threshold value, Slave will hold its position (Step VIII of FIG. 7). The interval ($\delta$) for sharing NED coordinates with Slaves should decide wisely. If it is high, then it may happen Master will move out of the network coverage; if very low, then unnecessarily, it increases the network load. During the transition phase, if Master FBS finds any Slave FBS is missing (ACK is missing), then Master FBS broadcasts the 'Hold Movement' message with a time gap to stop all Slave FBSs movement. Even after that time gap, if Master FBS cannot trace the Slave FBS, the Master FBS will march towards AoD with the remaining Slave FBSs. The missing Slave FBS after lost communication from Master FBS, will change its mode from GUIDED to AUTO mode and move towards the AoD by following its 3-D position shared by Master during the idle phase.

Performance Analysis:

This section evaluates the performance of HCP deployment technique by conducting a simulation and gives insights into the simulation results. For modeling the number of events and their UE distribution in the hotspot zone, Matern Cluster Point Process (MCPP) is considered. The reason to select MCPP is the UEs pattern around the events usually uniformly distributed for hotspot scenarios like exhibitions and fest with pop-up stores. The number of events in the event area is modeled by the parent process, whereas the daughter process is used to model the event's UE distribution. Here, our analysis mainly focuses on the UE distribution around a single event as the performance analysis for other events will be the same in an average sense.

The UEs are distributed from a range of 100 to 1000 around a square geographical event area (A) of 1 km×1 km. An urban environment is considered for simulation and the value of (a, b, $\eta_{LoS}$, $\eta_{NLoS}$) are set to (9.61, 0.16, 1 dB, 20 dB), respectively. The maximum transmits power (P), carrier frequency ($f_c$), noise power ($P_n$) and optimum elevation angle ($\theta$) are assumed to be 31 dBm, 5 GHz, −120 dBm and 42.44°, respectively. The FBS user handling capacity limit (K) and the SNR threshold ($Y_{th}$) is assumed to be 50 and 50 dB, respectively. For comparison with the proposed deployment technique, i.e., HCP, two types of Random Deployment (RD) are also considered. In the first type, FBSs with the same radius and equal to the radius obtained from HCP are deployed randomly over the AoD. It is named RD with fixed Radius (RDFR). In the second type, FBSs with random radius are deployed over the AoD. It is named as RD with Variable Radius (RDVR). In both RDFR and RDVR, the altitudes of FBSs are selected randomly. During deployment, RDFR and RDVR follow all the constraints considered in HCP to have a fair comparison. The performance metrics used for evaluation are packaging density, required to transmit power ($P_{req}$), UEs in outage and number of FBSs.

FIGS. 8A to 8C show the FBS deployment using HCP, RDFR and RDVR. In HCP, we can see that the FBSs are closely packed and offer a higher packaging density than both RDFR and RDVR. Here, the packaging density means the total area covered by the FBS network out of the area inside AoD. Under HCP, due to hexagonal packing, a higher packaging density is obtained compared to both RDFR and RDVR and it is very close to optimal packaging density. According to ["Circle Packing in Circle". Available Online: https://en.wikipedia.org/wiki/Circle_packing_in_a_circle], the optimal packaging density for 19 circles is 0.803, whereas the packaging density of HCP in FIG. 8A is 0.76 (obtained for $R_{big}$=515 m and R=103 m). Note, the optimal circle placement in ["Circle Packing in Circle". Available Online: https://en.wikipedia.org/wiki/Circle_packing_in_a_circle] follows different placement strategies for different numbers of FBS and it requires apriori information about the number of FBS to consider a placement strategy. However, HCP follows a common deployment strategy and does not require the number of FBSs information for its execution. The packaging density obtained for RDFR and RDVR with respect to the deployment shown in FIGS. 8B and 8C is 0.4 and 0.51, respectively.

FIG. 9 depicts the FBS transmit power ($P_{req}$) to maintain an SNR threshold of 50 dB in the case of HCP and RDFR deployment, as shown in FIG. 8. It is observed that the HCP requires minimum transmit power compared to RDFR, which helps prolong the flight time of the FBS. Note, although FBSs in HCP and RDFR have the same coverage radius, the FBS altitude in HCP is optimized for minimum energy consumption, whereas altitude is selected randomly in RDFR. In HCP, due to the same coverage radius, the optimized altitude of all FBSs is also the same. The maximum and minimum savings of transmit power in HCP compared to RDFR are 16.26 dB and 2.12 dB, respectively. FIGS. 10A and 10B depict the number of FBSs deployed over the AoD and UEs in outage for the deployed FBSs. The required numbers of FBS and UEs in outage parameters are evaluated for different numbers of UEs. Due to the compactness of hexagonal packing in HCP, the UEs in outage is low as compared to both RDFR and RDVR irrespective of the number of UEs. It is observed from the number of FBSs requirements that HCP offers lower outages with fewer FBSs than RDFR and RDVR. Table 1 shows a comparison study between HCP, RDFR and RDVR regarding outages and the number of FBS required to maintain that outage. It is found that 56.58% and 69.54% of more users can be accommodated in the network with HCP as compared to RDVR and RDFR, respectively. Similarly, the average number of FBSs requirement is 48.6% lower as compared to RDVR.

TABLE 1

Comparison between HCP, RDFR and RDVR

|  | 200 UEs | 400 UEs | 600 UEs | 800 UEs | 1000 UEs | Avg. outage reduction in HCP w.r.t | | Avg. No. FBS reduction in HCP w.r.t |
|---|---|---|---|---|---|---|---|---|
|  |  |  |  |  |  | RDVR | RDFR | RDVR |
| UEs in outage for HCP | 11.6% | 15.8% | 18.8% | 15.9% | 16% | 56.58% | 69.54% | 48.6% |
| UEs in outage for RDVR | 34.14% | 34.4% | 35.9% | 37.4% | 38.9% |  |  |  |
| UEs in outage for RDFR | 50% | 49.3% | 52.4% | 52.2% | 52.3% |  |  |  |

The advantages of the present invention can be summarized as hereunder:

1. The proposed 3-D deployment method for FBS-assisted network placement for 5G and beyond is energy-efficient.
2. The deployment method offers guaranteed QoS with no inter-FBS interference and FBS capacity limit violation, which are essential for the real-time placement of FBS. Hence, the designed deployment method is suitable from the network operator's perspective.
3. The deployment method offers a compact packing of FBS over the desired area that help in minimizing UEs in outage and also the requirement of the number of FBS. The compactness offered by the deployment method is close to the optimal packing technique.
4. The synchronization method that helps in collision avoidance does not require any object detection sensor like RADAR, SONAR and LiDAR. Thus, the synchronization technique helps in cost reduction and energy saving of battery-operated FBS.
5. The designed deployment method supports the energy-efficient and cost-effective C-RAN architecture which is widely adopted for 5G and beyond the network.
6. The synchronization method for handshaking and tracking each other helps autonomous movement of fleet of FBS without any collision.

The invention claimed is:

1. A system for providing communication network coverage to a target geographical region comprising
a fleet of unmanned aerial vehicle-based communication service providing Flying Base Stations (FBSs) including a master FBS;
a control server for receiving un-served users' locations in the target geographical region and accordingly defining an area of deployment (AoD) of the FBSs to cover all the un-served users' locations, said control server is connected to said master FBS to feed all the un-served users' locations to the master FBS;
said master FBS computes minimum required FBSs form said fleet and 3-D positions thereof on the AoD for said communication network coverage;
said master FBS includes operative connection with the FBSs in the fleet under master-slave architecture and share respective 3-D AoD locations of the slave FBSs in the fleet including activating each of the selected slave FBSs to establishes a wireless communication link with a base band unit (BBU);
said master FBS moves to a destination location at center of the AoD determining intermediate hop coordinates (waypoints) between its initial position and said destination location, whereby said master FBS is further configured to activate the selected slave FBSs on establishment of the wireless communication link between themselves for transition to the respective 3-D AoD locations following North-East-Down (NED) coordinates shared by the master FBS, whereby the selected FBSs on reaching to the respective 3-D AoD locations starts hovering at their respective 3-D positions on the AoD and provide required communication services to user's equipment in said AoD;

wherein the master FBS determines the respective 3-D AoD locations of the slave FBSs including horizontal positions of the slave FBSs over the AoD under Hexagonal Circle Packing (HCP) formation in lap by lap having the master FBS at center location of the AoD based on user handling capacity limit (K), maximum coverage distance ($R_{max}$) of the FBSs, user density ($D_u$), AOD center location ($X_{big}$, $Y_{big}$) and its operating region (AoD) coverage radius ($R_{big}$);

wherein the master FBS determines FBS coverage radius (R) by $$R = \sqrt{\frac{K}{D_u \times \pi}}$$

and total number of the laps (L) required of the AoD using $$L = \left\lceil \frac{R_{big} - R}{2R} \right\rceil,$$

ensuring that the coverage radius (R) satisfying condition $R \leq R_{max}$ for a QoS;

wherein the master FBS is deployed at the center location of the AoD circle ($X_{big}$, $Y_{big}$) for acting as reference point for the slave FBSs positions and the slave FBSs are sequentially placed in the laps as per determined polar coordinates ($r_{l,\,m}$, $\theta_{l,\,m}$) for each slave FBS including filling a particular lap with a certain number of FBSs maintaining condition $N_l=6l$ where $N_l$ is number of the FBS in $l^{th}$ lap and subsequently increasing lap number for further filling with the slave FBSs, whereby total number of the FBSs(S) that fitting inside the AoD circle is $S=3L^2+3L+1$, here, $r_{l,\,m}$ represents distance between centers of $m^{th}$ circle located inside the $l^{th}$ lap and the first FBS's center location ($X_{big}$, $Y_{big}$), $\theta_{l,m}$ indicates angle formed by the center of $m^{th}$ circle in $l^{th}$ lap with the first FBS center location;

wherein the master FBS determines the slave FBS polar coordinates ($r_{1,\,m}$, $\theta_{1,\,m}$) for first lap as

| | |
|---|---|
| $r_{l,\,m} = 2R$ | $\forall m = 1,2,\ldots,6$ |
| $\theta_{l,\,m} = 60 \times (m-1)$ | $\forall m = 1,2,\ldots,6$ | whereby for subsequent laps, values of n m is obtained for different FBSs with indices 'm' inside $l^{th}$ lap by $$r_{l,m} = \begin{cases} 2R \times l, & \forall\, m = (1, 1+l, 1+2l, \ldots) \\ \sqrt{3}R \times l, & \forall\, m = \left(1+\frac{l}{2}, 1+3\frac{l}{2}, \ldots\right) \& l \text{ is even} \\ [\{R(2-l \bmod 2)\}^2 + \{\sqrt{3}R \times l\}^2]^{0.5}, & \forall \text{ otherwise} \end{cases}$$

and $\theta_{l,\,m}$ is estimated by $$\theta_{l,m} = \frac{360}{N_l} \times (m-1)\ \forall\, m = 1, 2, \ldots, N_l.$$

2. The system as claimed in claim 1, wherein each of the FBSs includes flight controller module for collision avoidance and tracking of the FBS movement with inbuilt sensors such as a gyroscope, compass and accelerometer;

Global Positioning System (GPS) sensor integrated with the flight controller to find location of the FBS;

said sensors are used for estimating object's distance from the FBS and sending to the flight controller for necessary action including either increase or decrease speed of the FBS and position control unit to change the FBS position to avoid any collision.

3. A method for providing communication network coverage to a target geographical region involving the system as claimed in claim 1 comprising involving the fleet of UAV based FBSs which are under idle phase and located in a launching zone;

defining the AoD by the control server covering all the uncovered users' location by identifying and collecting the locations of unserved users in the geographical region that either fall under a coverage hole between base stations or can't be associated with nearest base stations due to overloading;

feeding all said unserved users' locations to the master FBS for executing steps to find minimum required FBSs and 3-D positions thereof on the AoD for said communication network coverage with no inter-FBS interference and FBS capacity limit violation;

involving the master FBS for selecting required number of the slave FBSs from said fleet based on their Unique Identification Number (UIN) and share their respective 3-D AoD locations;

transition of said master FBS to destination location at center of the AoD determining intermediate hop coordinates (waypoints) between its initial position and the destination location;

activating each of the selected slave FBS to establishes the wireless communication link with the base band unit;

subsequent transition of the selected slave FBSs to their respective 3-D AoD locations following North-East-Down (NED) coordinates shared by the master FBS and on command of the master FBS on establishment of the communication links with the base band unit, wherein swarm of the selected slave FBSs form a hexagonal packing over the AD and start hovering at their respective 3-D positions and provide the communication services.

4. The method as claimed in claim 3, wherein defining of the AoD includes forming an operating circle region with a minimum radius ($R_{big}$) and center location ($X_{big}$, $Y_{big}$) that can cover all the uncovered users present in the target geographical area.

5. The method as claimed in claim 3, wherein determination of the horizontal position (longitude X, latitude Y) and the vertical position (altitude H) for each of the slave FBSs includes determining the horizontal positions of the slave FBS that ensure a certain QoS with no inter-UAV interference and capacity limit violation; and determining vertical positions of the FBSs by selecting energy-efficient altitude that offers minimum path-loss.

6. The method as claimed in claim 5, wherein determination of the horizontal positions of the slave FBSs including selecting the positions of the FBSs for placement over the AoD under the Hexagonal Circle Packing (HCP) formation having the master FBS at center location of the AoD and the slave FBSs in lap by lap around the central master FBS comprises feeding the master FBS with FBS user handling capacity limit (K), user density ($D_u$), maximum coverage distance ($R_{max}$), AoD center location ($X_{big}$, $Y_{big}$) and its operating region (AoD) coverage radius ($R_{big}$);

determining the FBS coverage radius (R) by $$R = \sqrt{\frac{K}{D_u \times \pi}}$$

and total number of the laps (L) required of the AoD using $$L = \left\lceil \frac{R_{big} - R}{2R} \right\rceil,$$

ensuring that the coverage radius (R) satisfying condition $R \leq R_{max}$ for the guaranteed QoS;

deploying initial master FBS at the center location of the AoD circle ($X_{big}$, $Y_{big}$) for acting as reference point for finding other slave FBSs positions;

sequentially placing the slave FBSs in the laps as per determined polar coordinates ($r_{l,m}$, $\theta_{l,m}$) for each slave FBS including filling a particular lap with a certain number of FBSs maintaining condition $N_l$=6l where $N_l$ is number of the FBS in $l^{th}$ lap and subsequently increasing lap number for further filling with the slave FBSs, whereby total number of the FBSs(S) that fitting inside the AOD circle is $S=3L^2+3L+1$, here, $r_{l,m}$ represents the distance between centers of $m^{th}$ circle located inside the $l^{th}$ lap and the first FBS's center location ($X_{big}$, $Y_{big}$), $\theta_{l,m}$ indicates angle formed by the center of $m^{th}$ circle in $l^{th}$ lap with the first FBS center location;

transforming the polar coordinates of the FBSs to cartesian coordinates ($x_{l,m}$, $y_{l,m}$), whereby center locations of all the FBSs are determined by adding their respective cartesian coordinates with the reference coordinate ($X_{big}$, $Y_{big}$).

7. The method as claimed in claim 6, wherein the maximum coverage radius ($R_{max}$) which guarantees the QoS is determined by $$L(H, R_{max}) = 20 \log\left(\frac{4\pi f_c}{C}\right) + 20 \log\left(\sqrt{H^2 + R_{max}^2}\right) + \eta_{NLoS} + \frac{\eta_{LoS} - \eta_{NLoS}}{1 + a\exp^{-b\left(\left\{\frac{180}{\pi}\tan^{-1}\left(\frac{H}{R_{max}}\right)\right\}-a\right)}}$$

where $f_c$ is the carrier frequency; c is the speed of light; $\eta_{LOS}$ is the average fading loss due to shadowing for a Line of Sight (LoS) communication link; $\eta_{NLOS}$ is the average fading loss due to shadowing for a Non Line of Sight (NLoS) communication link; a and b are the environmental parameter, which varies in different environments like sub-urban, urban and dense-urban.

8. The method as claimed in claim 3, wherein the FBS user handling capacity limit K is $\lfloor C_{max}/c_u \rfloor$, where $C_{max}$ is maximum supported data rate by the FBS estimated for the FBS's antenna configuration and operating bandwidth and $c_u$ is the data rate promised by FBS to UEs.

9. The method as claimed in claim 8, wherein the FBS polar coordinates $r_{1,m}$ and $\theta_{1,m}$ for first lap is determined by

| | |
|---|---|
| $r_{l,m} = 2R$ | $\forall m = 1,2, \ldots, 6$ |
| $\theta_{l,m} = 60 \times (m-1)$ | $\forall m = 1,2, \ldots, 6$ | whereby for subsequent laps, values of n, m is obtained for different FBSs with indices 'm' inside $l^{th}$ lap by $$r_{l,m} = \begin{cases} 2R \times l, & \forall m = (1, 1+l, 1+2l, \ldots) \\ \sqrt{3} R \times l, & \forall m = \left(1+\frac{l}{2}, 1+3\frac{l}{2}, \ldots\right) \& l \text{ is even} \\ \left[\{R(2 - l \bmod 2)\}^2 + \{\sqrt{3}R \times l\}^2\right]^{0.5}, & \forall \text{ otherwise} \end{cases}$$

and $\theta_{l,m}$ is estimated by $$\theta_{l,m} = \frac{360}{N_l} \times (m-1) \ \forall \ m = 1, 2, \ldots, N_l.$$

10. The method as claimed in claim 3, wherein determining vertical positions of the slave FBSs comprises finding pathloss as a function of the FBS altitude (H) and its coverage radius (R) as $L(H,R)=P+G-P_n-Y_{th}$ for a given FBS having a maximum transmittable power (P), directive antenna gain (G) and noise power ($P_n$) to maintain received Signal to Noise Ratio (SNR) of boundary user above a certain threshold value ($Y_{th}$);

finding a stationary point of the slave FBS by increasing values of the slave altitude (H) for the obtained coverage radius (R) from the horizontal placement which corresponds to a minimum average pathloss.

11. The method as claimed in claim 3, wherein transition of the slave FBSs from launching zone to determined 3D location includes path planning and inter-FBS synchronization of the FBSs during transition comprising the steps of activation of all the selected slave FBSs by the master FBS including resetting the initial reference NED coordinates (0, 0, 0) of the selected slave FBSs;

adding different biases to the initial reference coordinate for maintaining a gap between FBSs to avoid collision during the transition phase and having separation between two consecutive selected slave FBS positions ($L_{SS}$) as $$L_{SS} = \frac{2\pi L_{MS}}{N_s},$$

where $N_S$ is the number of slave FBSs, $L_{MS}$ is the distance between master FBS and slave FBS, which is also the radius of the circle formed by slave FBSs;

transition of the master FBS slightly before a take-off time towards the AoD while the slave FBSs wait until the take-off time as broadcasted by the master FBS, whereby the master FBS also conveys the command to all slave FBSs to configure to GUIDED mode.

12. The method as claimed in claim 3, wherein the master FBS estimates intermediate geodetic hop coordinates according to hop distance between the hop coordinates, which is assumed to be twice the FBS separation gap ($L_{SS}$) while flying towards the AoD, and follows the hop coordinates through GPS navigation to reach the target area;

wherein the master FBS intermittently shares its own NED coordinates as obtained from onboard GPS sensor and sensors of the flight controller with the slave FBSs to guide them to reach AoD, and simultaneously tracks the slaves' movement from their received signal strength indicator;

wherein the slave FBSs on receiving the master FBS NED coordinates fetches its own NED coordinates and computes relative distance $R_N$, $R_E$, $R_D$, which are with respect to the North, East and Down axis and on detecting the relative distance is greater than a predefined threshold distance, the slave FBSs march toward the master FBS to minimize the relative distance, while once the relative distance becomes less than the threshold distance value, the slave FBSs hold its position.

13. The method as claimed in claim 3, wherein magnitude of the velocity component of each slave FBS is directly proportional to the relative distance between present NED location ($N_S$, $E_S$, $D_S$) and its target master FBS's NED location ($N_m$, $E_m$, $D_m$)).

14. The method as claimed in claim 3, wherein master FBS on finding any slave FBS is missing during transition, broadcasts movement holding command with a time-period to stop all the slave FBSs movement and after that time-period, if the master FBS cannot trace the missing slave FBS, the master FBS march towards the AoD with the remaining slave FBSs, whereby the missing slave FBS after lost communication from the master FBS, change its mode from GUIDED to AUTO mode and move towards the AoD by following its 3-D position shared by the master FBS during the idle phase.

* * * * *